United States Patent Office 3,070,544
Patented Dec. 25, 1962

3,070,544
CLAY BENEFICIATION
William R. Johnson, Texas City, and David T. Oakes, Dickinson, Tex., assignors to Monsanto Chemical Company, St. Louis, Mo., a corporation of Delaware
No Drawing. Filed Nov. 21, 1960, Ser. No. 70,395
10 Claims. (Cl. 252—8.5)

The present invention relates to the treatment of clays and, more particularly, to the beneficiation thereof by chemical treatment to render them especially useful in the production of well drilling muds.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

Drilling fluids or muds of this character are usually prepared from clay or commercial mud bases having gel-forming characteristics. Clays suitable for this purpose are of two general types: Wyoming or bentonitic clays and native or sub-bentonitic clays. The choice of a particular clay insofar as mud preparation is concerned depends upon its yield value. The yield of clay is defined as the number of barrels (42 gallons per barrel) of aqueous dispersion or mud having a viscosity of 15 centipoises which can be prepared from a ton of clay. Generally speaking, a yield of at least 90 barrels of 15-centipoise mud per ton of clay is the minimum standard for acceptable material. Such a yield can be expected with the purer forms of sodium bentonite such as Wyoming bentonite but is not attained with less pure forms or with the calcium and other meta- and sub-bentonites. Actual laboratory tests made with typical clays of the bentonitic and sub-bentonitic types have shown that a yield of anywhere from 50 to 100 barrels is obtainable with the former types while the latter produce only from 25 to 50 barrels. Thus, while the bentonitic clays are preferred because of their superior yields some of these even do not come up to the required standards. There is a need, therefore, for increasing the yield obtainable from both the low-yield bentonitic clays and the sub-bentonitic clays so as to increase their utility as mud-making materials and make them competitive with Wyoming bentonite. Also, there are distinct advantages to be gained in further up-grading of so-called "high-yield" clays. Great economies can be effected, for example, if the yield can be doubled so that only half the amount of clay is required to prepare a given quantity of high quality drilling fluids. Too, a mud of low-solids content gives faster drilling rates and thus lowers appreciably the cost of drilling a well.

Attempts have been made to up-grade the low-yield clays but such attempts have been generally without success. One method widely used has been to add to the clay a peptizing agent such as soda ash or sodium carbonate. This method of base exchanging the calcium ions with sodium ions has not always been successful by any means probably because the base exchange cannot be forced to completion in a practical manner and the slight improvement achieved is not economical.

Accordingly, it is an object of the present invention to provide a method for beneficiating a clay either of the bentonitic or sub-bentonitic type so as to increase its yield.

It is a further object of the invention to provide a method and means for improving the mud-forming characteristics of clays used to make well drilling muds and more especially for increasing the yield of mud obtainable from such materials.

Another object of the invention is to provide a composition for use in making drilling muds whereby higher yields of mud are possible than could be obtained heretofore from raw materials of the same quality.

Other objects and advantages of the invention will become apparent from the following description thereof.

In accordance with the invention, the yield of a clay is increased by treating said clay with a water-soluble interpolymer comprising substantially equimolar portions of maleic anhydride and an olefin having from 2 to 4 carbon atoms and diallyl ether in an amount in the range from about 0.1% to about 5.0% by weight based on the reacting monomers. Particularly preferred are the interpolymers of ethylene, maleic anhydride and diallyl ether.

The interpolymer beneficiating agents can be added to the clay in any desired manner. In general, a simple mechanical mixture of the clay and polymer treating agent is prepared by dry-blending the interpolymer in powder form directly with dry clay. This can be done conveniently at the time the clay is ground in a roller mill, for example. Alternatively, an aqueous solution of the interpolymer may be sprayed directly onto the clay either in stock piles, after crushing, during a grinding operation, or during a bag-packing operation. Also, if desired, the clay and interpolymer can be separately added in any desired order to form a slurry. This type of wet mixing, although not preferred, could be employed, for example, at the well site.

The amount of the interpolymers needed for treatment depends to some extent on the degree of beneficiation desired and varies with the clay but generally only very small quantities are required. Amounts within the range from about 0.1 to about 10 lb. per ton of clay will produce satisfactory results. The preferred quantities for treatment are from about 1.5 to 3.5 lb./ton of clay. In general, the yield obtainable at a concentration of 3 lbs. of the interpolymers per ton of clay lies in the range from 160–190 barrels. With some clays, yields as high as 195 barrels have been achieved by increasing the concentration to 3.5 lb./ton of clay. In some instances, a maximum yield of 150 barrels is obtained with 1.5 lb. of the interpolymers per ton of clay and further addition results in a decrease in yield value.

The interpolymers useful as clay beneficiating agents are those having a specific viscosity of at least 0.3, it being understood that the specific viscosity value is that determined at 25° C. on a 1% solution (by weight) of the anhydride form of the interpolymer in dimethylformamide. It is difficult to establish any one preferred range of specific viscosity for the interpolymers since this is a factor which varies somewhat depending upon the particular interpolymer employed as the treating agent, the specific clay being treated, etc. With some clays, for example, optimum results are achieved with an interpolymer having a specific viscosity in the range from about 0.6 to about 2.0 while with others an interpolymer with a specific viscosity in the range from about 1.0 to about 3.0 produces the best results.

When the clay to be beneficiated is a sub-bentonitic or calcium montmorillonite type of clay, the interpolymers of olefin, maleic anhydride and diallyl ether are employed for best results together with an alkali metal compound which is water-soluble, ionizable, and has an anion capable of reacting with calcium to form a water-insoluble precipitate. Such compounds include alkali metal carbonates, hypophosphates, oxalates, phosphates, silicates, sulfites and tartrates. Particularly preferred is sodium carbonate or soda ash. The amount of the alkali metal compound employed will be somewhat dependent upon the proportion of calcium montmorillonites in the whole clay. Generally, amounts from about 1% to about 7% by weight of the clay can be used with increasing amounts giving higher degrees of beneficiation. However, because amounts slightly in excess of 7% can act to reduce the yield of clay, it is advisable in order to secure maximum results and still allow some latitude in operation, to employ amounts slightly less than 7%. With soda ash, for instance, preferred amounts are those from about 3 to about 7% by weight with optimum results being obtained with about 5% by weight.

The interpolymers used as clay beneficiating agents are readily prepared by polymerizing a mixture of maleic anhydride, a $C_2$–$C_4$ olefin, i.e., ethylene, propylene, n-butylene, and isobutylene, or olefin mixture and diallyl ether. The amount of diallyl ether employed depends to some extent upon the olefin employed but generally lies in the range between 0.1 and 5.0% by weight of the total polymerizable mixture. When ethylene is a comonomer, for example, the amount of diallyl ether added should not exceed about 3.0% in order that the interpolymer produced will have the required viscosity when dispersed in water. With the higher olefins, the amount of diallyl ether can be increased up to the 5% level if desired. Amounts in excess of those specified usually result in the diallyl ether functioning as a chain-transfer agent in the polymerization rather than as a comonomer.

The polymerization is carried out in an inert organic solvent, preferably a non-polymerizing hydrocarbon solvent, having solvating action on the monomers but little appreciable solvent or swelling action on the interpolymer produced. In this way, the polymer is obtained in the form of a fine powder which only requires freeing from solvent before use. Suitable solvents include, for example, ethylene dichloride, ethyl acetate, dioxane and, particularly, aromatic hydrocarons such as benzene, toluene and xylene.

While the olefin and maleic anhydride react in substantially equimolar proportions, in the usual method for producing the interpolymers, the olefin is employed in excess. The anhydride and the diallyl ether in the desired proportions are charged to the reactor dissolved in the solvent and the reactor is then brought up to the desired pressure by charging the olefin. Operating pressure is thereafter maintained by continuous charging of olefin throughout the reaction period. The monomers are preferably dissolved in an amount of solvent such that the solids content of the reaction slurry formed is about 15%. This ordinarily represents an amount of solvent about six times the total weight of the compounds to be polymerized. The amount of solvent is not critical, however, and proportions of solvent as much as 10 or 20 times the weight of the olefin and maleic anhydride may be used. Alternatively, the diallyl ether may be added to the mixture of anhydride and olefin during the course of the polymerization either over part or all of the polymerization period.

The resulting solution is mixed thoroughly and heated sufficiently so that the polymerization reaction takes place.

An organic solvent-soluble catalyst is necessary. Any of the organic free-radical-catalysts is satisfactory. Among these are various organic solvent-soluble peroxygen compounds including benzoyl peroxide, capryl peroxide, acetyl peroxide, acetyl benzoyl peroxide, di-tert-butyl peroxide and others, azoisobutyronitrile, dimethyl azoisobutyrate and many others. Mixtures of such catalysts are also suitable in the polymerization process of the invention. Radiation polymerization can be used too, e.g., such high-energy radiation sources as X-rays, $\gamma$-rays, neutrons and the like can be used to initiate polymerization.

The polymerization can be carried out at a temperature within the range from 0° C. to 100° C. with optimum temperatures varying with the particular $C_2$–$C_4$ olefin employed. Preferred temperatures lie for the most part in the range from 40° C. to 80° C. Pressure may vary from atmospheric to about 600 p.s.i.g. or higher depending upon the particular olefin used.

At the completion of the polymerization reaction, the interpolymer is recovered from the organic solvent by any suitable means.

While the interpolymers may be used in the anhydride or acid form, they are more commonly employed as clay beneficiating agents in the form of their alkali metal or ammonium salts. Alkali metal or ammonium salts of the interpolymers such as sodium, potassium, lithium, rubidium and caesium salts may be obtained by reacting the interpolymers with the stoichiometric amount of the corresponding hydroxide. Partial salts may, of course, be produced by using less than the quantity of alkali required to effect complete conversion of the carboxyl groups. When polymeric anhydrides are reacted with anhydrous ammonia, an appreciable amount of amide groups are formed resulting in mixed ammonium-amide polymeric salts.

The following examples are presented to illustrate the invention but are not to be construed as limiting it in any manner whatsoever. The testing procedure used for obtaining yield values for both treated and untreated clays was as follows:

About 10 g. of clay was added to 350 ml. of distilled water alone or to distilled water containing a dissolved interpolymer of an olefin, maleic anhydride and diallyl ether in the desired concentration and the suspension was mixed in a Hamilton-Beach mixer for 15 minutes. For convenience, a 0.25% aqueous solution of the interpolymers tested was prepared and this solution was added to the water using a burette to obtain the desired concentration. Two ml. of this solution represented a 1 lb./ton treatment level. Immediately after mixing, the viscosity of the slurry was determined using a Fann viscosimeter and recorded. The mixture was covered and allowed to stand for a period of 24 hr. After this aging, the mixture was again subjected to mixing for three minutes in a Hamilton-Beach mixer and the viscosity of the slurry was again determined. In the thermal stability tests, the mixture was then subjected to heating at a temperature of about 150° F. for 72 hr. in an oven of special design which provided for continuous rolling of the mud containers. Subsequently, the mixture was stirred for 3 minutes and its viscosity measured. Yield values were estimated from the viscosimeter dial readings by means of graphs prepared from a collection of such readings.

Example 1

Effect of treatment on a sample of bentonite clay commercially availabe from The Milwhite Mud Sales Company, Houston, Tex.

Additive: A composite mixture of interpolymers of equimolar proportions of ethylene and maleic anhydride and 1% by weight of diallyl ether in the sodium salt form having specific viscosities in the range from 0.68–2.2.

| Additive lb./ton | Viscosity (cp.) (15 min.) | Estimated yield (bbl.) | Viscosity (cp.) (24 hr.) | Estimated yield (bbl.) |
|---|---|---|---|---|
| 0 | 2.75 | 95 | 3.25 | 100 |
| 1 | 8.75 | 155 | 7.0 | 142 |
| 2 | 12.75 | 182 | 10.5 | 168 |
| 3 | 14.9 | 201 | 12.0 | 177 |
| 3.5 | 15.0 | 205 | 12.5 | 180 |
| 4 | 14.25 | 195 | 12.5 | 180 |

Example 1 shows that a commercially produced clay of originally acceptable yield can be significantly upgraded by the interpolymer of the invention.

*Example 2*

Effect of treatment on a sample of bentonite clay commercially available from the Baroid Division, National Lead Company, Houston, Tex., under the trade name "Aquagel."

Additive: Interpolymer of substantially equimolar proportions of ethylene and maleic anhydride and 1% by weight of diallyl ether having a specific viscosity of 2.82.

| Additive lb./ton | Viscosity (cp.) (15 min.) | Estimated yield (bbl.) | Viscosity (cp.) (24 hr.) | Estimate yield (bbl.) |
|---|---|---|---|---|
| 0 | 2.5 | 93 | 2.5 | 93 |
| 2.5 | 13.0 | 183 | 10.25 | 164 |
| 3.0 | 11.0 | 170 | 12.25 | 177 |
| 3.5 | 14.25 | 195 | 13.0 | 183 |
| 4.0 | 10.0 | 164 | 13.5 | 187 |

Example 2 again demonstrates that dramatic increases in yield of so-called "good" clays can be effected by treating them with interpolymers of ethylene, maleic anhydride and diallyl ether. Here with only 2.5 lb./ton of clay treated, an increase in yield of almost 100% is obtained.

*Example 3*

Effect of treatment of a sample of high-yield Wyoming bentonite at the 3-lb./ton level.

Additives: Interpolymers of equimolar proportions of ethylene and maleic anhydride and 1% by weight of diallyl ether of various specific viscosities.

| Additive $\eta_{sp}$ | Viscosity (cp.) (15 min.) | Estimated yield (bbl.) | Viscosity (cp.) (24 hr.) | Estimated yield (bbl.) | Viscosity (cp.) (72 hr. at 150° F.) | Estimated yield (bbl.) |
|---|---|---|---|---|---|---|
| 0.84 | 14.0 | 190 | 13.5 | 186 | 11.75 | 176 |
| 0.95 | 14.0 | 190 | 13.0 | 183 | 11.25 | 172 |
| 1.14 | 13.25 | 184 | 12.25 | 179 | 10.75 | 167 |
| 1.24 | 14.5 | 195 | 13.25 | 184 | 11.25 | 172 |
| None | 2.75 | 95 | 3.25 | 100 | | |

Example 3 shows not only a two-fold increase in yield value for an already high-yield Wyoming bentonite after treatment with the interpolymers but it demonstrates that with these beneficiating agents there is less decrease in yield values from the 15-mm. to the 24-hr. readings than is usually observed. More importantly, it illustrates that the treated clay is relatively stable thermally when subjected to elevated temperatures. The decrease in yield value after heating is less than 10% as compared with usual decreases of the order of 15% to 20%.

*Example 4*

Effect of treatment on native or sub-bentonitic clay mined in Mexico and identified as Santiago-Galas Clay No. 3.

Additives: Interpolymer of substantially equimolar proportions of ethylene and maleic anhydride and 1% by weight of diallyl ether in its sodium salt form having a specific viscosity of 2.22 alone, soda ash alone, and the interpolymer together with soda ash.

| Interpolymer additive lb./ton | Soda ash weight percent of clay | Viscosity (cp.) (15 min.) | Estimated yield (bbl.) | Viscosity (cp.) (24 hr.) | Estimated yield (bbl.) |
|---|---|---|---|---|---|
| 0 | 0 | 1.37 | 28.0 | 1.37 | 28.0 |
| 0 | 1 | 1.37 | 28.0 | 1.5 | 30.0 |
| 0 | 3 | 1.50 | 30.0 | 1.62 | 35.0 |
| 0 | 5 | 1.62 | 35.0 | 1.75 | 40.0 |
| 0 | 7 | 1.87 | 44.0 | 2.0 | 48.0 |
| 3 | 0 | 1.5 | 30.0 | 1.5 | 30.0 |
| 5 | 0 | 1.5 | 30.0 | 1.5 | 30.0 |
| 3 | 1 | 1.5 | 30.0 | 2.0 | 48.0 |
| 3 | 3 | 5.2 | 120.0 | 5.5 | 127.0 |
| 3 | 5 | 4.75 | 110.0 | 4.5 | 102.0 |
| 7 | 7 | 4.60 | 108 | 4.0 | 95 |

Example 4 shows that the interpolymers of the invention are also effective for increasing the yield value of a sub-bentonitic clay, i.e., a calcium bentonite or montmorillonite, when employed in conjunction with soda ash effecting a yield almost three times better than that which can be obtained with soda ash alone.

Tests similar to those described in the foregoing examples have been made with an analogous interpolymer of propylene, maleic anhydride and diallyl ether and have demonstrated that this interpolymer is useful as a clay beneficiating agent. Likewise, comparable results are obtained when employing the isobutylene-maleic anhydride-diallyl ether for clay beneficiation.

What is claimed is:

1. A composition of matter consisting essentially of an intimate admixture of a bentonitic clay and a water-soluble interpolymer consisting of substantially equimolar proportions of an olefin having from 2–4 carbon atoms and maleic anhydride and from about 0.1% to about 5% by weight of diallyl ether, said interpolymer having a specific viscosity of at least 0.3 and said interpolymer being present in an amount sufficient to increase the yield of said clay.

2. The composition of claim 1 wherein said interpolymer is present in an amount in the range from about 0.1 lb. to about 10 lb. per ton of said clay.

3. A composition of matter consisting essentially of an intimate admixture of a bentonite clay and a water-soluble interpolymer consisting of substantially equimolar proportions of ethylene and maleic anhydride and from about 0.1% to about 5% by weight of diallyl ether, said interpolymer having a specific viscosity of at least 0.3 and said interpolymer being present in an amount sufficient to increase the yield of said clay.

4. The composition of claim 3 wherein said interpolymer is present in an amount in the range from about 0.1 lb. to about 10 lb. per ton of said clay.

5. The composition of claim 3 wherein said interpolymer has a specific viscosity within the range from about 0.6 to about 3.0 and is present in an amount in the range from about 1.5 lb. to about 3.5 lb. per ton of clay.

6. A composition of matter consisting essentially of an intimate admixture of a sub-bentonitic clay, a water-soluble, ionizable alkali metal compound having an anion capable of reacting with calcium ions to form a water-insoluble precipitate, said compound being present in an amount from about 1% to about 7% by weight of said clay, and an interpolymer consisting of equimolar proportions of an olefin having from 2–4 carbon atoms and maleic anhydride and from about 0.1% to about 5% by weight of diallyl ether, said interpolymer having a specific viscosity of at least 0.3 and said interpolymer being present in an amount sufficient to increase the yield of said clay.

7. The composition of claim 6 wherein said interpolymer is present in an amount in the range from about 0.1 lb. to about 10 lb. per ton of said clay.

8. A composition of matter consisting essentially of an intimate admixture of a sub-bentonitic clay, a water-soluble, ionizable alkali metal compound having an anion capable of reacting with calcium ions to form a water-insoluble precipitate, said compound being present in an amount from about 1% to about 7% by weight of said clay, and an interpolymer consisting of equimolar proportions of ethylene and maleic anhydride and from about 0.1% to about 5% by weight of diallyl ether, said interpolymer having a specific viscosity of at least 0.3 and said interpolymer being present in an amount sufficient to increase the yield of said clay.

9. The composition of claim 8 wherein said interpolymer is present in an amount in the range from about 0.1 lb. to about 10 lb. per ton of said clay.

10. A composition of matter consisting essentially of an intimate admixture of a sub-bentonitic clay, soda ash in an amount from about 1% to about 7% by weight of said clay, and an interpolymer consisting of equimolar proportions of ethylene and maleic anhydride and from about 0.1% to about 5% by weight of diallyl ether, said interpolymer having a viscosity of at least 0.3 and said interpolymer being present in an amount in the range from about 1 lb. to about 10 lb. per ton of said clay.

References Cited in the file of this patent

UNITED STATES PATENTS

| | | |
|---|---|---|
| 2,702,788 | Dawson | Feb. 22, 1955 |
| 2,718,497 | Oldham et al. | Sept. 20, 1955 |
| 2,948,678 | Turner et al. | Aug. 9, 1960 |